J. KNICKERBACKER.
FIRE HYDRANT.
APPLICATION FILED JUNE 14, 1909.
990,990.
Patented May 2, 1911.
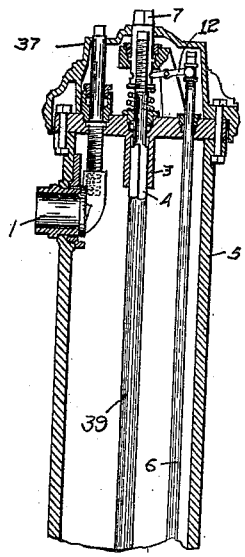
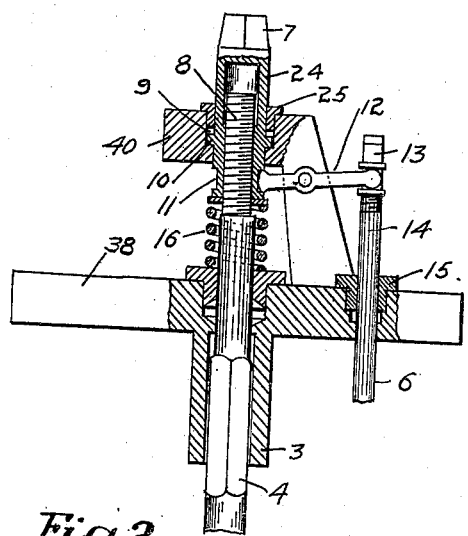
Fig. 1.
Fig. 2.
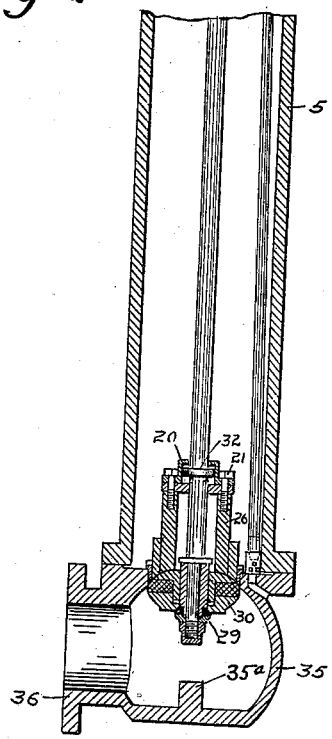
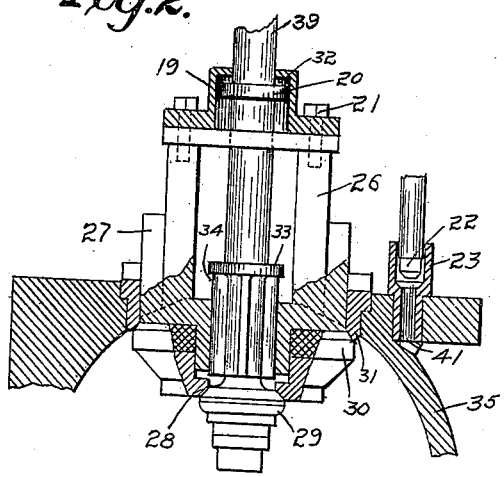
WITNESSES:
Walter E. Paul.
C. A. Mason.
INVENTOR
John Knickerbacker,
BY W. Schoenborn
ATTORNEY

UNITED STATES PATENT OFFICE.

JOHN KNICKERBACKER, OF TROY, NEW YORK, ASSIGNOR TO EDDY VALVE COMPANY, OF WATERFORD, NEW YORK, A CORPORATION OF NEW YORK.

FIRE-HYDRANT.

990,990.  Specification of Letters Patent.  Patented May 2, 1911.

Application filed June 14, 1909. Serial No. 502,000.

*To all whom it may concern:*

Be it known that I, JOHN KNICKERBACKER, a citizen of the United States, residing at Troy, in the county of Rensselaer and State of New York, have invented certain new and useful Improvements in Fire-Hydrants, of which the following is a specification.

This invention relates to hydrants and particularly to fire-hydrants of that class known as compression-hydrants, that is, hydrants in which the main valve is held to its seat by the pressure of water behind it.

The prime objects of the invention are to provide a more efficient and readily operable device of this class wherein the actuator first opens an auxiliary valve to let pressure into the stand pipe whereby the main valve becomes balanced and falls by its own weight, or is easily opened.

Other objects are to provide improved connections whereby a single actuator by continuous movement successively operates the main valve, the auxiliary valve and the drain device.

With these and other objects which will hereinafter appear in view, the invention will be fully understood from the following detailed description taken in connection with the accompanying drawings and the matter of novelty will thereafter be particularly pointed out in the appended claims.

Referring to the drawings:—Figure 1 is a central vertical section through the improved hydrant, and Fig. 2 is a like view of the valves and operating device on an enlarged scale, the central portion being broken away in both views.

The stand pipe or body 5 of the hydrant has the bottom 35 and the cover 37 bolted thereto through suitable flanges at either end. Between the upper flange of the stand pipe and the cover there is yoke plate 38 which carries the upper end of the hydrant stem 39 with its operating nut 24, and the drip rod 6. The hydrant stem rod 39 has at its upper end a threaded portion 8 which engages the internal threads of the operating nut 24. It also has a squared portion 4 to engage a square socket 3 on the underside of yoke plate 38 to prevent its rotation, but allowing it to have an up and down movement.

The operating nut 24 is carried by the yoke 40 of the yoke plate 38, having a collar 10 that takes a bearing in said yoke. As will be seen the collar 10 of the operating nut is not closely confined to the bearing but has a limited up and down movement through the space 9, this space being limited by the follower nut 25. The nut 24 is shown as squared at 7 for ready engagement by an opening tool. The operating nut also has the annular groove 11 for the purpose of engaging one end of the drip rod lever arm 12. This arm 12 is fulcrumed to the yoke plate and its outer end engages an adjustable nut 13 on the upper end 14 of the drip rod 6. A collar 15 receives and guides said rod 6 through the plate 38.

The operating nut 24 is supported by a coiled spring 16, this spring being stiff enough to lift the nut and hydrant stem 39 to the upper limit of the space 9.

The main valve 30 consists of a disk that has a beveled edge coöperating with a like beveled edge or surface 31 within the hydrant bottom 35 and making a water tight joint. It is further provided with upwardly projecting arms 26 which carry a dash pot 19 to coöperate with a piston 20 fixed on the hydrant stem 39. As shown, said dash pot is fixed to the arms 26 by bolts 21.

The hydrant stem 39 is fixed directly to an auxiliary valve 29 which passes centrally through and has a limited movement relative to the main valve and has a seating thereon as at 28. A collar 33 adjacent the other side of the main valve limits the said relative movement and the ribs 34 between this and the valve 29 permit flow of water when the valve is open. The end of the drip rod 6 is equipped with a plug valve 22 having a seat in the bottom of drip cup 23 thus controlling the drain passage 41. The operating nut may be revolved until the lower end of the stem 39 is stopped by a lug 35ᵃ on the lower surface of the hydrant bottom.

The hydrant bottom 35 may be equipped with an ordinary flange 36 for attachment to the pressure main.

In operation the nut 24 is revolved by means of a wrench fitted over the square end 7 thereof and the stem 39 thus forced downward, opening the auxiliary valve 29. The water pressure within the hydrant bottom will keep the main valve 30 closed until the pressure within the stand pipe is equal to that in the hydrant bottom when the main valve will fall by its own weight.

But should the outlet nozzle 1 be open the main valve will remain closed until forced open by the continued downward movement of the stem rod 39. The collar 33 on the auxiliary valve comes in contact with the main valve disk and carries it along in its downward travel. When the operating nut 24 is revolved to cause the stem 39 to travel downward, the nut will first rise until its collar 10 comes in contact with the lower surface of the threaded bushing 25. This slight upward movement through the space 9 is sufficient to operate the drip rod 6 by means of its connection through the annular groove, lever arm 12 and adjustable nut 13, and move it downward, thus closing the drainage 41 of the stand pipe 5 before either the auxiliary valve or the main valve is opened. When the hydrant is open the water passes through the pipe connection 36, through the main valve 30, filling the stand pipe 5, and escaping through the outlet nozzle 1.

Having now fully described my invention, what I claim as new and desire to secure by Letters Patent is as follows:

1. A hydrant comprising a stand pipe, an admission valve, a drain device, an operating stem for said valve, an operating nut for said stem, said nut having a limited play in its bearings, means for yieldingly holding said nut at one limit of its movement and a connection from said nut to the drain device.

2. A hydrant comprising a stand pipe, an admission valve and drain device therefor, a stem for said valve, said stem having a squared portion engaging a like bearing, an operating nut for said stem having a small endwise play in its bearing, means for yieldingly holding said nut at one limit of its movement, and a connection from said nut to the drain device to operate the same.

3. A hydrant comprising a stand pipe, an admission valve and a drain device therefor, a stem for said valve, an operating nut for said stem, said nut having a small endwise play in its bearing, a yoke plate clamped between the top of the stand pipe and the cover, a spring encircling said stem and disposed between said plate and said nut, and a connection from said nut to said drain device.

4. A hydrant comprising a stand pipe, an admission valve and a drain device therefor, a stem for said valve, an operating nut for said stem, said nut having a slight endwise movement in its bearing, a yoke plate clamped to the top of the stand pipe having an upstanding yoke forming a bearing for said nut, a compression spring encircling said stem and disposed between said plate and said nut and a connection between said nut and said drain device.

5. A hydrant comprising a stand pipe, a main admission valve therefor, an auxiliary admission valve disposed within said main valve, a stem connected to said auxiliary valve and having lost motion operative relation to said main valve, an operating nut for said stem having a small end play in its bearing, a spring for holding said nut at one limit of its movement, a connection from said nut to a drain device and said drain device.

In testimony whereof I affix my signature in presence of two witnesses.

JOHN KNICKERBACKER.

Witnesses:
 FRED. S. ROBINSON,
 WALTER S. ROBINSON.

---

Copies of this patent may be obtained for five cents each, by addressing the "Commissioner of Patents, Washington, D. C."